US 6,826,562 B1

(12) United States Patent
Leung et al.

(10) Patent No.: US 6,826,562 B1
(45) Date of Patent: Nov. 30, 2004

(54) METHOD OF SIMPLIFYING AND OPTIMIZING SCALAR SUBQUERIES AND DERIVED TABLES THAT RETURN EXACTLY OR AT MOST ONE TUPLE

(75) Inventors: Ting Yu Leung, San Jose, CA (US); Monica Sachiye Urata, Saratoga, CA (US); Swati Vora, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,795

(22) Filed: Nov. 29, 1999

(51) Int. Cl.[7] .............................................. G06F 17/30
(52) U.S. Cl. ............................................... 707/4; 707/2
(58) Field of Search ................... 707/1–10, 100–104.1, 707/200–205, 500, 526

(56) References Cited

U.S. PATENT DOCUMENTS

| | | | | |
|---|---|---|---|---|
| 5,404,510 A | * | 4/1995 | Smith et al. ................ 706/934 |
| 5,442,782 A | * | 8/1995 | Malatesta et al. .............. 707/4 |
| 5,546,576 A | | 8/1996 | Cochrane et al. ........... 395/600 |
| 5,551,029 A | * | 8/1996 | Jagadish et al. ........ 707/103 R |
| 5,615,361 A | | 3/1997 | Leung et al. ................ 395/603 |
| 5,701,454 A | | 12/1997 | Bhargava et al. ........... 395/602 |
| 5,724,570 A | * | 3/1998 | Zeller et al. ................... 707/3 |
| 5,822,750 A | | 10/1998 | Jou et al. ........................ 707/2 |
| 5,864,840 A | | 1/1999 | Leung et al. ................... 707/2 |
| 5,873,075 A | | 2/1999 | Cochrane et al. .............. 707/2 |
| 5,884,299 A | | 3/1999 | Ramesh et al. ................. 707/2 |
| 5,893,088 A | | 4/1999 | Hendricks et al. ............. 707/3 |
| 6,006,224 A | * | 12/1999 | McComb et al. ........... 707/102 |
| 6,076,082 A | * | 6/2000 | Kindo ......................... 706/12 |
| 6,115,508 A | * | 9/2000 | Lopresti et al. ............. 235/456 |
| 6,199,063 B1 | * | 3/2001 | Colby et al. ................ 707/102 |
| 6,202,063 B1 | * | 3/2001 | Benedikt et al. ........ 707/103 R |
| 6,345,266 B1 | * | 2/2002 | Ganguly et al. ............... 707/1 |
| 6,349,308 B1 | * | 2/2002 | Whang et al. ................. 707/1 |
| 6,349,310 B1 | * | 2/2002 | Klein et al. ................ 707/100 |
| 6,363,387 B1 | * | 3/2002 | Ponnekanti et al. .......... 707/10 |

OTHER PUBLICATIONS

Pirahesh, Hamid; Hellerstein, Joseph M.; and Hasan, Waquar; "Extensible/Rule Based Query Rewrite Optimization in Starburst"; 1992 ACM SIGMOD—6/92/CA, USA;pp. 39–48.

* cited by examiner

Primary Examiner—Greta Robinson
Assistant Examiner—Harold E. Dodds, Jr.
(74) Attorney, Agent, or Firm—Sandra M. Parker, Esq.

(57) ABSTRACT

An optimization technique for SQL queries, a program storage device storing the optimization program, and an apparatus for optimizing a query is provided. A query is analyzed to determine whether it includes subselect expressions that return exactly or at most one tuple. If so, the quantifier merger or elimination is performed, if possible, to allow query to perform more efficiently than that of the original query while providing same results. The query is then executed in the computer to efficiently retrieve data from the database.

27 Claims, 9 Drawing Sheets

METHOD OF SIMPLIFYING AND OPTIMIZING SCALAR SUBQUERIES AND DERIVED TABLES THAT RETURN EXACTLY OR AT MOST ONE TUPLE

BACKGROUND OF THE INVENTION

1. Field of the Invention

This invention relates in general to database management systems performed by computers, and in particular to the simplification and optimization of derived tables that return exactly one row and scalar subqueries in a database management system.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or more tables and produces a new table as a result. The power of SQL lies on its ability to link information from multiple tables or views together to perform complex sets of procedures with a single statement.

One of the most common SQL queries executed by RDBMS software is the SELECT statement. In the SQL standard, the SELECT statement generally has the format: "SELECT <clause> FROM <clause> WHERE <clause> GROUP BY <clause> HAVING <clause> ORDER BY <clause>." The clauses generally must follow this sequence. Only the SELECT and FROM clauses are required and all other clauses are optional.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause.

The search condition typically comprises one or more predicates, each of which specifies a comparison between two values from certain columns, constants or correlated values. Multiple predicates in the WHERE clause are typically connected by Boolean operators.

The SELECT statement may also include a grouping function indicated by the GROUP BY clause. The GROUP BY clause causes the rows in the intermediate result set to be grouped according to the values specified in the clause. A number of column or aggregate functions are also built into SQL, such as MAX (maximum value in column), MIN (minimum value in column), AVG (average of values in column), SUM (sum of values in column), and COUNT (number of rows).

Queries using aggregate expressions return as many result rows as there exist unique "result groups" in the source of the aggregation. A result group is defined as the set of values contained in the fields of a row corresponding to the list of columns or expressions specified in the GROUP BY clause of the query. The value of the aggregate function is the result of applying the function to the result of the contained expression for each row having the same group value.

Another operation permitted by SQL is the JOIN operation, which concatenates horizontally all or parts of two or more tables to create a new resulting table. The JOIN operation is implied by naming more than one table in the FROM clause of a SELECT statement.

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar column comparison operation.

In RDBMSs, columns of any type can assume NULL (i.e., unknown) values. In RDBMS software, NULL values are properly handled using tri-value logic (i.e., TRUE, FALSE or UNKNOWN) for predicates, and SQL-based RDBMSs employ such logic.

SQL queries can have subqueries or derived tables where the nesting can be arbitrarily deep.

If we have a view defined on table S and use the view in a query as follows:

CREATE VIEW V AS (SELECT C1, C2 FROM S)
SELECT*
FROM T, V
WHERE T.C1=V.C1 the following query uses an equivalent derived table DT in lieu of the view definition:

SELECT*
FROM T, TABLE(SELECT C1, C2 FROM S) AS DT(C1, C2)
WHERE T.C1=DT.C1

Nested SQL statements may require tuple-by-tuple data manipulation in each subquery for evaluation of the complete statement. For example, each entry of a table column may need to be compared against each entry of a corresponding column in another table to determine if a SELECT operation should retrieve a table row. Such tuple-by-tuple operations are very inefficient and require simplification and optimization.

In an SQL system, queries are received by the SQL interface and are rewritten in an SQL processor from the input format provided by the user into generally standard SQL language. The SQL processor is sometimes implemented as an SQL compiler. To evaluate the query, an SQL execution plan is generated by the SQL processor from the rewritten SQL code and is provided to an SQL optimizer, which determines the best implementation of the execution plan.

Graphical Representation of SQL Queries by Query Graph Model (QGM)

A useful tool in describing SQL queries and their evaluation is a graphical representation of SQL statements known as Query Box Representation (QBR). Known SQL optimizers employ various types of QBR to facilitate their processing and optimization efforts. QBR provides a powerful and manageable representation of queries used to reduce the complexity of query compilation and optimization procedures. Additionally, QBR provides a tool for optimizing queries by facilitating rewriting the QBR components in efficient arrangements.

Generally, a QBR representation employs hierarchically arranged "boxes" to represent subquery operations, such as SELECT and GROUP BY. The interconnections between the boxes define the relationship between different items of data from different subquery operations.

Various techniques may be used to store a complex query in computer memory in accordance with a QBR format. Specifically, multiple data structures in the memory are used to represent the QBR boxes and interrelationships. These data structures may comprise, for example, records and associated pointers, strings, stack arrangements, doubly linked lists, hashing arrangements, or other suitable formats. Preferably, records and pointers are used, where each record represents a QBR box, and the pointers represent the relationships between the boxes. Each record also includes a listing of various properties associated with the corresponding QBR box.

A number of different types of QBR are known in the art. One of the more popular types of QBR is known as the Query Graph Model (QGM), well known in the art, and described in the following reference, which is incorporated by reference in its entirety: Pirahesh et al., "Extensible/Rule Based Query Rewrite Optimization in Starburst," Proceedings of ACM SIGMOD '92 International Conference on Management of Data, San Diego, Calif., U.S.A., 1992.

The query graph model supports arbitrary table operations where the inputs are tables and outputs are tables. Such operations are SELECT, GROUP BY, UNION, INTERSECT, and EXCEPT operations, as defined in the SQL standard, and the restriction, projection and join operations performed by the SELECT operation.

When a query is represented by the query graph model, each operation of the query may be graphically represented by a box having a head and body. The body of a query graph model box may include "quantifiers", corresponding to table references or derived tables. Quantifiers are labeled with the columns that it needs from the table it ranges over. Quantifiers may have different types. Type "F" (For Each) quantifiers correspond to the table references in the FROM clause of the SQL query. Type "A" (Universal) quantifiers correspond to the ALL subquery in the WHERE clause. Type "E" (Existential) quantifiers correspond to the subquery associated with SQL's predicates EXISTS, IN, ANY, and SOME, which are true if at least one tuple of the subquery satisfies the predicate. In QGM, the quantifiers associated with existential and universal subqueries are called COUNTING quantifiers. Type "S" (Scalar) quantifiers correspond to scalar subqueries. The database system has to enforce the rule that exactly one tuple has to be returned from the scalar subquery. If the subquery does not produce any rows, a tuple with null value(s) will be returned via the S quantifier. On the other hand, if the subquery returns more than one rows, a runtime error will be raised. Additionally, quantifiers may be ordered within a box to support asymmetric operators, such as EXCEPT.

The query graph model boxes are coupled to each other by quantifier "edges", also called "arcs". The head of a box describes the output data stream or table produced by the operation, and the body specifies the operation required to compute the output table from records flowing into the body. The head specifies each output column, such as those specified in the SELECT clause of a query, and includes column names, types, and output ordering information. The head, body, and quantifiers of a box may each have a separate attribute called "DISTINCT", to manage the production of duplicate tuples.

Figure 1:
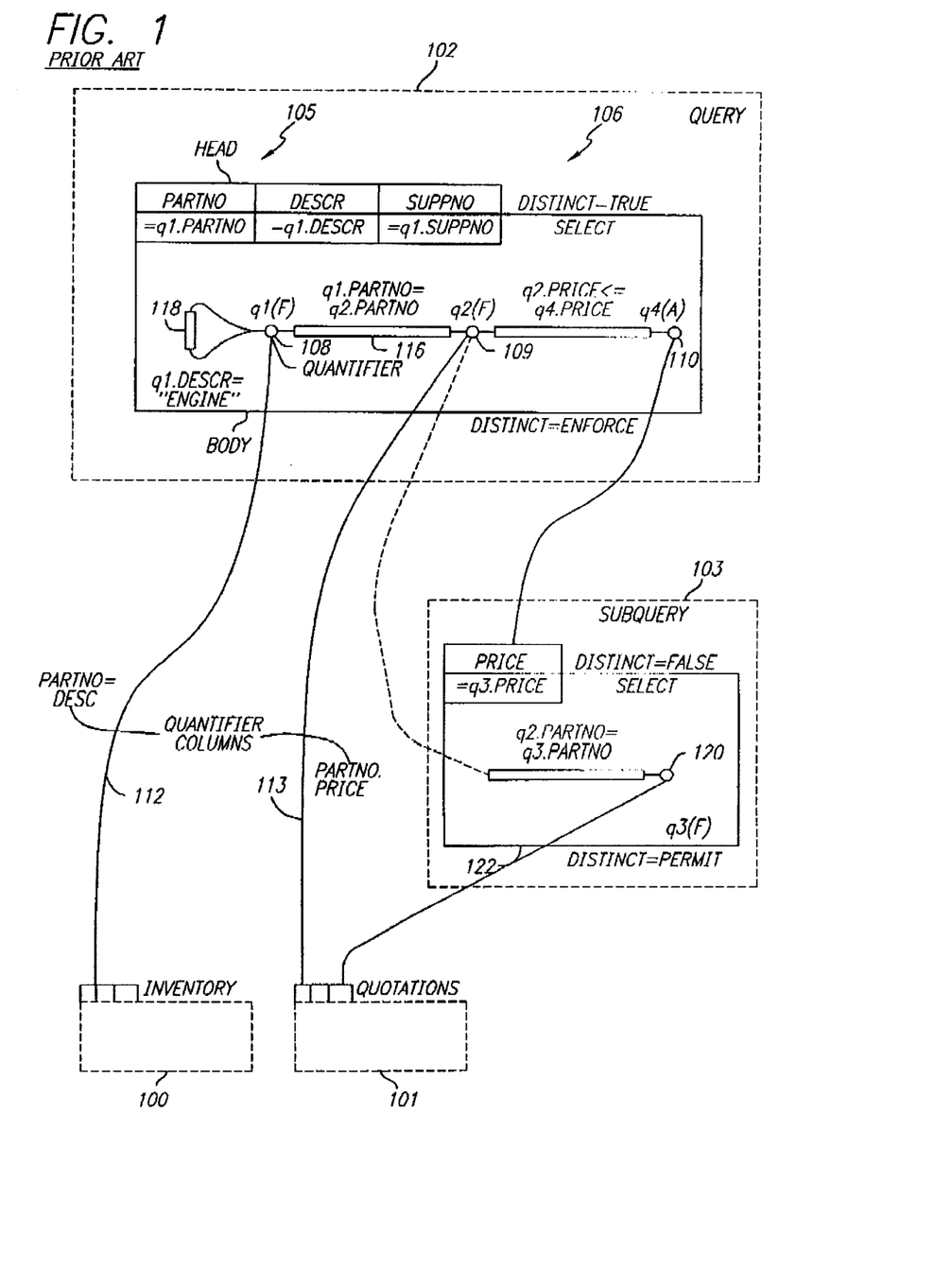
FIG. 1 illustrates the QGM technique, according to the prior art.

FIG. 1 illustrates an exemplary query graph model corresponding to the following SQL query.

```
SELECT DISTINCT Q1.PARTNO, Q1.DESCR, Q2.SUPPNO
FROM INVENTORY Q1, QUOTATIONS Q2
WHERE Q1.PARTNO = Q2.PARTNO AND Q1.DESCR='ENGINE'
AND Q2.PRICE <= ALL (SELECT Q3.PRICE
                     FROM QUOTATIONS Q3
                     WHERE Q2.PARTNO=.Q3.PARTNO)
```

This query provides information about suppliers and parts for which the supplier price is less than that of all other suppliers. The corresponding query graph model of FIG. 1 contains four boxes 100, 101, 102, 103. Two of the boxes 100 and 101 are associated with the tables INVENTORY and QUOTATIONS, respectively. The third box 102 is a SELECT box representing the main part of the query, and the box 103 is a SELECT box representing the subquery.

In accordance with the query graph model convention, each of the boxes 100–103 has a head and a body, where each head describes the output columns produced by the associated box, and the body specifies the operation required to compute the output. "Base" tables, exemplified by boxes 100–101, are considered to have empty or nonexistent bodies because they do not perform any operations.

Referring in greater detail to the SELECT box 102, a head 105 is shown, specifying output columns PARTNO, DESCR, and SUPPNO which correspond to the SELECT clause of the main query. The specification of these columns includes column names, types, and output ordering information. The head 105 includes a distinct attribute 106, which indicates that the associated table contains only distinct tuples and may not have duplicates.

The body of each non-base table box contains a graph, the vertices of which represent quantified tuple variables, the quantifiers. The vertices, which are represented with dark circles, are also called "nodes". In the box 102, for example, vertices 108–110 correspond to quantifiers Q1, Q2, and Q4. Quantifiers Q1 and Q2 range over the INVENTORY and QUOTATIONS base tables respectively, and correspond to the table references in the FROM clause of the SQL query.

As stated above, arcs (also called "inter-box edges") connect quantifiers to other boxes or to each other. For example, the Q1 and Q2 quantifiers (nodes 108–109) are connected via arcs 112–113 to the heads of the boxes 100–101, respectively. Arcs may also interconnect quantifiers of the same box where each inter-quantifier arc represents a predicate of the WHERE clause in the query block. Such predicates are represented by labeled rectangles along the corresponding edge. Such edges are also called Boolean factors. For example, the Q1 and Q2 quantifiers are interconnected by an edge 116 that represents a join predicate. A looped edge 118 attached to the Q1 (node 108) represents a local predicate on the quantifier Q1. In the head 105 of the box 102, each output column may have an associated expression corresponding to expressions allowed in the SELECT clause of the query. In FIG. 1, all of these expressions are simple identity functions over the referenced quantified columns.

Quantifier Q4 is a UNIVERSAL quantifier is of type A, because it is associated with the ALL subquery in the WHERE clause. This means that for ALL tuples associated with Q4, the predicate represented by the edge between Q2 and Q4 is TRUE.

In Box 3, Q1 and Q2 participate in joins, and some of their columns are used in the output tuples. These quantifiers have type F (ForEach), since they come from the query's FROM clause. Box 4 represents the example's subquery. It contains an F quantifier Q3 over the QUOTATIONS table, and has a predicate that refers to Q2 and Q3.

The body of every box in QGM has an attribute called DISTINCT that may have one of the following values: ENFORCE, PRESERVE or PERMIT. ENFORCE means that the operation must eliminate duplicates in order to enforce head.distinct=TRUE. PRESERVE means that the operation must preserve the number of duplicates it generates. This could happen because head.distinct=FALSE, or because head.distinct=TRUE and no duplicates could exist in the output of the operation, even without duplicate elimination. PERMIT means that the operation is permitted to eliminate (or generate) duplicates arbitrarily. For example, the DISTINCT attribute of Box 4 can have the value PERMIT, because its output is used in a universal quantifier (Q4 in Box 3), and universal quantifiers are insensitive to duplicate tuples.

Like the body of every box, each quantifier also has an attribute called DISTINCT that may have a value of ENFORCE, PRESERVE or PERMIT. ENFORCE means that the quantifier requires the table over which it ranges to enforce duplicate elimination. PRESERVE means that the quantifier requires that the exact number of duplicates in the lower table be preserved. PERMIT means that the table below may have an arbitrary number of duplicates. Existential and universal quantifiers can always have DISTINCT=PERMIT, since they are insensitive to duplicates.

RDBMS software supports view definitions, and a view can be used anywhere a table can be used. Views, just like queries and subqueries, may be represented with a QGM, with one or many boxes. When a view is referenced in a query, its QGM becomes part of the QGM graph of the query. Derived tables, which are similar to view definitions, can be defined anywhere a table can be used, and their QGM become part of the QGM graph of the query.

In the body of every box, each output column may have an associated expression corresponding to one of the expressions allowed in the select list of the query. These expressions are called head expressions. The output of a box can be used multiple times (e.g., a view may be used multiple times in the same query), creating common subexpressions.

In the remainder of this paper we draw only rough sketches of QGM graphs, omitting details that are not critical to the discussion.

This particular invention is designed to simplify and optimize scalar subqueries, although it may be applied to derived tables as well. By definition, scalar subquery returns one and only one row. Therefore, there are two requirements that a DBMS must honor when dealing with scalar subqueries. First, if the subquery returns an empty set, a row of null(s) will be returned instead. Second, if the evaluation of the subquery returns more than one row, a runtime error is generated. Generally speaking, we refer to these subqueries and derived tables as "subselect expressions".

Because of the above two properties, scalar subqueries are more difficult to optimize. Many researchers have tried to transform a scalar subquery to a join, which is much easier to optimize, and to define conditions under which such transformation is valid. According to one such example, a valid condition exists if a query optimizer can show that the maximal number of rows to be returned by the subquery is one, and that, when a row of nulls is returned by the subquery, the row will not change the query answer set.

Some of the conditions summarized in the prior art are defined in the publication by Cliff Leung, Hamid Pirahesh, Praveen Seshadri, and Joseph Hellerstein entitled "Query Rewrite Optimization Rules in IBM DB2 Universal Database," Readings in Database Systems, 3rd Edition, edited by Stonebraker and Hellerstein-, 1998.

A more recent research demonstrates an optimization technique where a scalar subquery can be converted into a join using subsumption techniques. It is described in U.S. patent application 09/450,795, entitled "Exploitation of Subsumption in Optimizing Scalar Subqueries, with filing date (Aug. 13, 1998 Filed in US; Co-inventor: Pirahesh, M. H.)

While there have been various techniques developed for optimizing the performance of SQL statements by transforming scalar subquery and derived tables which produce exactly or at most one tuple, there is further need in the art for optimization of these queries.

SUMMARY OF THE INVENTION

The foregoing and other objects, features, and advantages of the present invention will be apparent from the following detailed description of the preferred embodiment which makes reference to several drawing figures.

One preferred embodiment of the present invention includes a method of optimizing a query in a computer by merging quantifiers, the query being performed by the computer to retrieve data from a database stored in an electronic storage device coupled to the computer. The method analyzes the query to determine whether the query includes at least two subselect expressions, and performs the subsumption test to determine whether the two subselects produce the same row sets except the output columns. If so, it determines whether each subselect returns at most one tuple from the database. If so, it performs merging the two subselects into a single subselect, and merging quantifiers corresponding to the merged subselect expressions.

Another preferred embodiment of the present invention includes a program storage device storing the optimization program for merging quantifiers.

Yet another preferred embodiment of the present invention includes an apparatus for optimizing a query according to the method for merging quantifiers.

Still another preferred embodiment of the present invention includes a method of optimizing a query in a computer, by eliminating subqueries, the subquery being performed by the computer to retrieve data from a database stored in an electronic storage device coupled to the computer. The method analyzes the query to determine whether the query includes at least one subselect. If so, it determines whether the subselect returns exactly one tuple from the database. If so, it determines whether the result set returned from the subselect is not required for query answer set. If so, the method eliminates the subselect expression and the quantifier corresponding to the subselect.

Another preferred embodiment of the present invention includes a program storage device storing the optimization program for eliminating quantifiers.

Yet another preferred embodiment of the present invention includes an apparatus for optimizing a query according to the method for eliminating quantifiers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

There is need to further optimize scalar subqueries. The present invention discloses a method, apparatus and computer program storage device for optimizing SQL queries. The method analyzes the query to determine whether the query includes at least two subselects, and performs the subsumption test to determine whether the two subselects produce the same row sets except the output column. If so, it determines whether each one of the subselects returns at most one tuple from the database. If so, it performs merging the subselects into a single subselect, and merging quantifiers corresponding to the merged subselects.

In some situations, a subselect and corresponding quantifier can be entirely removed. In other situations, several subqueries and corresponding quantifiers can be merged together into a single subquery to improve the query performance by allowing generation of more efficient execution plans for retrieving data from the database.

The preferred embodiment of the present invention discloses an improved optimization technique using the Query Graph Model (QGM).

Hardware and Software Environment

Figure 2:
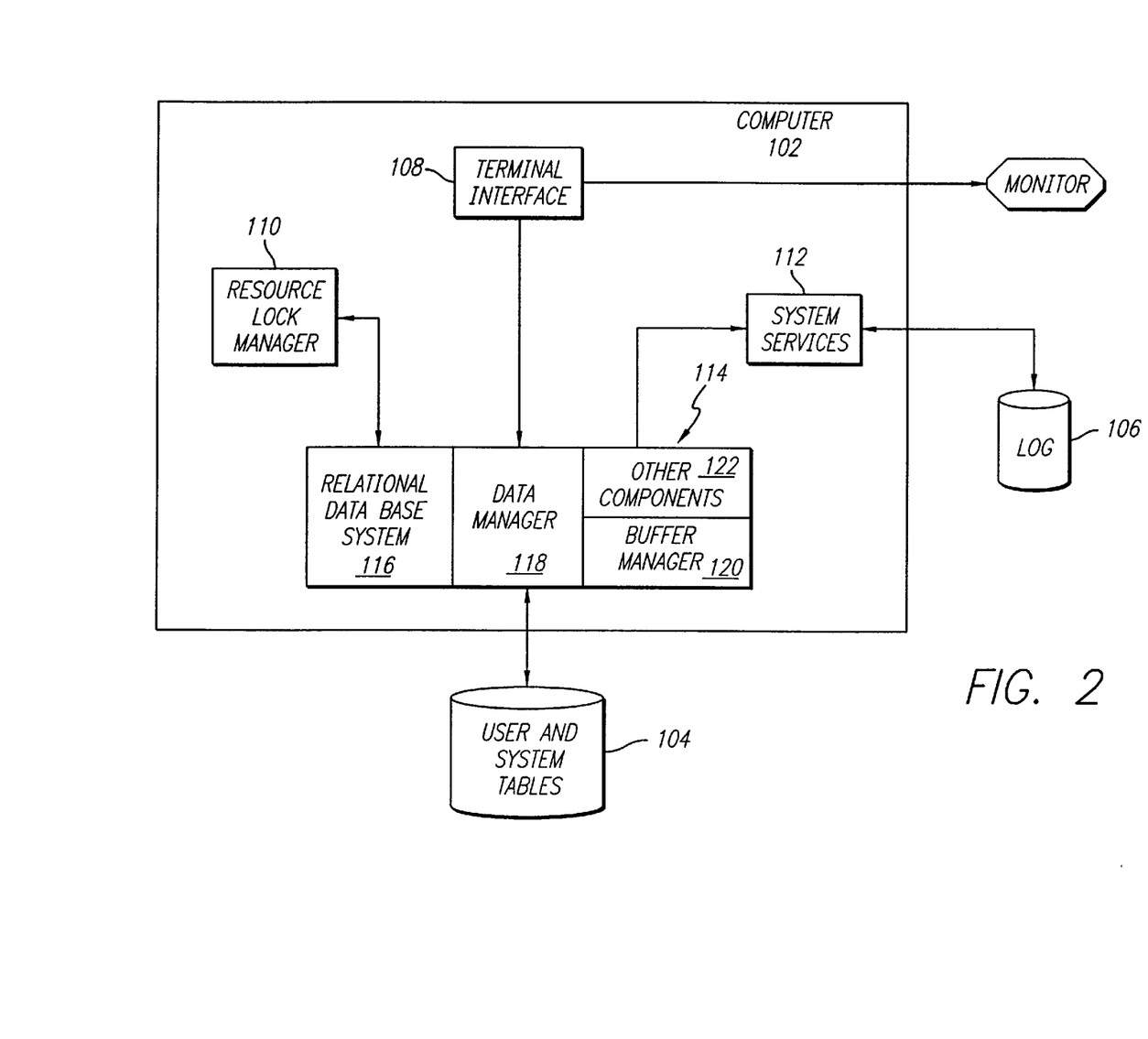
FIG. 2 illustrates a computer hardware and software environment usable in the present invention.

FIG. 2 illustrates an exemplary computer hardware environment that could be used with the present invention. In the exemplary environment, a computer system 102 is comprised of one or more processors with computer memory, connected to one or more electronic storage devices 104 and 106, such as disk drives, that store one or more databases. These drives may comprise, for example, optical disk drives, magnetic tapes and/or semiconductor memory.

Operators of the computer system 102 use a standard operator terminal interface 108, such as IMS/DB/DC, CICS, TSO, OS/2 or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL, and may similarly be applied to non-SQL queries.

Figure 3:
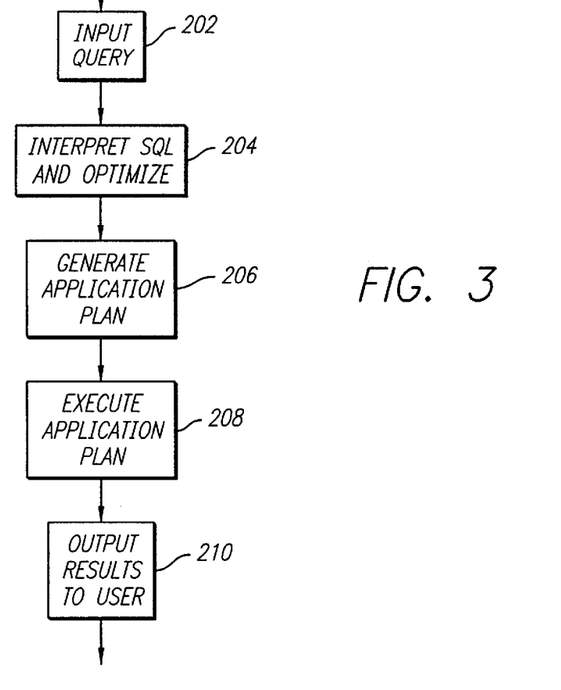
FIG. 3 is a flowchart illustrating the steps for the interpretation and execution of SQL statements in an interactive environment, usable in the present invention.

As illustrated in FIG. 3 the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

FIG. 3 is a flowchart illustrating the steps necessary for the interpretation and execution of SQL statements in an interactive environment, according to the present invention. Block 202 represents the step of accepting the user's input of SQL statements into the computer system 102. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not the instructions on how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 4:
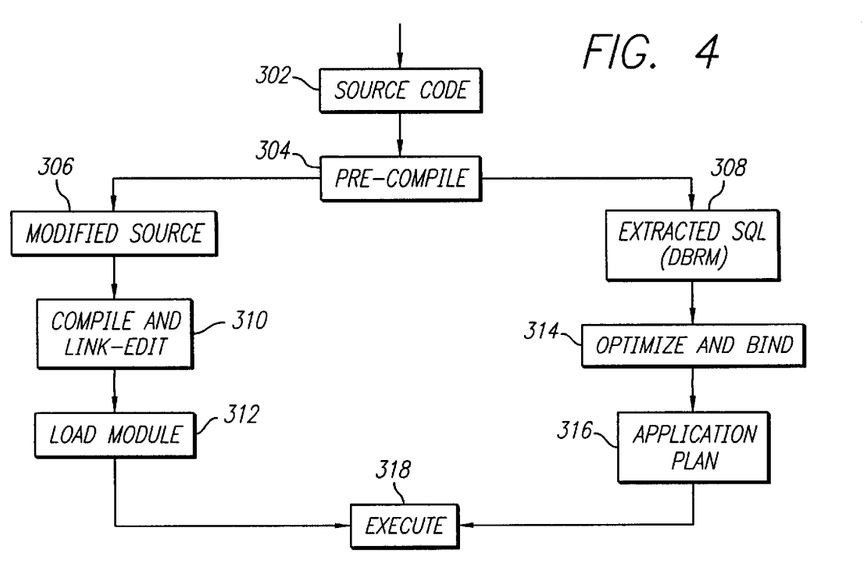
FIG. 4 is a flowchart illustrating the steps for the interpretation and execution of SQL statements in an embedded source code, usable in the present invention.

FIG. 4 is a flowchart illustrating the steps necessary for the interpretation and execution of SQL statements embedded in source code, according to the present invention. Block 302 represents program source code containing a host language (such as COBOL or C) and embedded SQL statements. The program source code is then input to a precompile step 304. There are two outputs from the precompile step 304: a modified source module and a Database Request Module (DBRM) 308. The modified source module 306 contains host language calls to DB2, which the precompile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Those skilled in the art will recognize that any combination of components, including computer hardware, peripherals and other devices, computer system software programs and application programs may be used to implement the present invention, so long as similar functions are performed thereby. Many modifications of the proposed preferred embodiments may be made without departing from the scope of the present invention.

SQL Optimization

Figure 5:
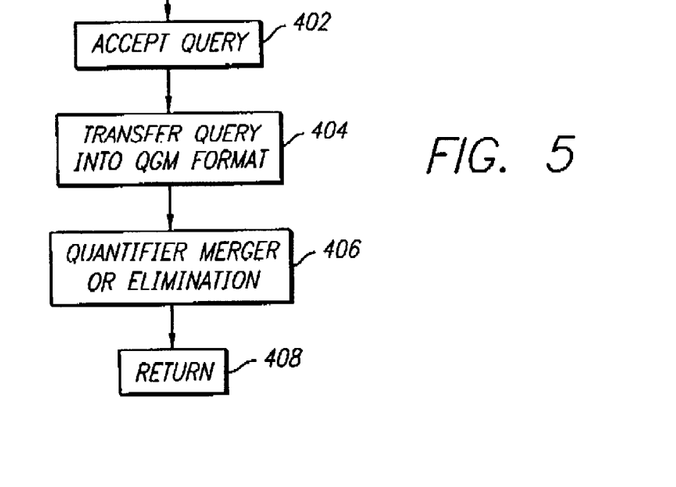
FIG. 5 is a flowchart illustrating the method of optimizing SQL queries in steps 204 of FIG. 3 and 314 of FIG. 4 according to the present invention.

FIG. 5 is a flowchart illustrating the method of optimizing SQL queries in steps 204 of FIG. 3 and 314 of FIG. 4 according to the present invention. Block 402 represents the acceptance of the SQL query. Block 404 represents the translation of the query into a Query Graph Model (QGM). Block 406 represents one of the improved optimization techniques for quantifier merger/elimination associated with a subselect expression which returns at-most/exactly one tuple, as presented in the preferred embodiments of the present invention. One such technique is quantifier merger, shown in FIG. 12 and another is quantifier elimination, shown in FIG. 13. Block 408 represents a return point from the optimization technique.

The operation of the present invention can be best understood in the context of the following examples, where the tables T and X are defined by statements:

CREATE TABLE T (C1 INT, C2 INT, C3 INT)
CREATE TABLE X (C1 INT, C2 INT, C3 INT)

Merging Quantifiers

In order to define merging of multiple quantifiers method embodiment of the present invention, following query is considered:

(Q1)
SELECT (SELECT C1 FROM T WHERE T.C2=X.C1),
       (SELECT C2 FROM T WHERE T.C2=X.C1)
FROM X

This query calls for selection of all tuples from the table X where the first column in table X (X.C1) matches the second column in table T (WHERE T.C2=X.C1). The first output column is T.C1 of the matched row whereas the second output column is T.C2 of the matched row.

In this example, both subqueries access table T with correlation predicates using table X. A traditional query optimizer would generate two separate execution subplans for the two subqueries and since both scalar subqueries are correlated to the table X, the query execution time could be very long.

However, since in this example, for each row of table X the result set produced by evaluating the first scalar subquery is the same as that of evaluating the second scalar subquery, except that different columns are retrieved from table T, the above query can therefore be rewritten as:

(Q1')
SELECT (SELECT C1, C2 FROM T WHERE T.C2= X.C1)
FROM X

The rewritten query Q1' is more efficient than the original query because there is only one scalar subquery. Thus, the table T is accessed only once for each row of table X, whereas in the original query Q1, the table T is accessed twice. This transformation is valid regardless of whether either table has a primary key or not.

In order to determine whether the two scalar subqueries or two derived tables that return at most one tuple could be merged into one subquery, the preferred embodiment of the present invention utilizes a well-known technique called "subsumption test".

Using QGM terminology, a SELECT box X is said to be subsumed by another SELECT box Y, if the result set of X is a subset of the result set of Y, and if the output column set of X is a subset of the output column set of Y. In this case the result set of X can be re-derived using the result set of Y.

When the predicate set in box X is a superset of the predicate set in Y, then the SELECT box X filters out more rows since it has more predicates than the box Y.

In the following queries L and M:

L: SELECT*FROM T WHERE C1>0 AND C2>0
M: SELECT*FROM T WHERE C1>0

The result set produced by L is a subset of the result set produced by M because both queries select rows from the same table T (i.e., table T is a common subexpression), and all predicates in M appear in L. Hence, M subsumes L.

In QGM, query subsumption can be defined in terms of predicate set mapping. In this example a SELECT box A from the query L has a quantifier Q and a SELECT box B from the query M has a quantifier Q', and the quantifiers Q and Q' range over a common subexpression table T, referenced by the SELECT boxes A and B.

The respective predicate sets in queries L and M are:

L: Q.C1>0 and Q.C2>0
M: Q'.C1>0

In this case query L has two predicates in its predicate set and query M has one predicate in its predicate set.

The predicate set mapping rule may be defined as follows: a predicate from a predicate set of one query can be mapped into a corresponding predicate from a predicate set of another query by mapping their corresponding quantifiers if they range over a common subexpression. For example, the predicate set in the query M can be mapped by mapping the quantifier {Q'} to {Q}, so that the query M becomes:

M: Q.C1>0

Therefore, subsumption can be defined as predicate set mapping, where corresponding predicates are mapped via their respective quantifiers.

For example, if the predicate set in select box B, mapped from the quantifier {Q} to {Q'}, is a subset of the predicate set in select box A, then A is subsumed by B, which means that all the rows produced by A can be found in the result set produced by B. In this case A is a subsumee and B a subsumer.

Since the result set of the subsumee can be re-derived from the subsumer result set, in this example the result set of query L can be obtained by applying the predicate "C2>0" on the result set of query M. The predicate that needs to be applied on the subsumer result set in order to re-derive the subsumee result set is called "compensation predicate".

By definition, a SELECT box X is identical to another SELECT box Y iff box X is subsumed by Y and Y is subsumed by X, i.e., there is no need for a compensation predicate. This test does not require that all output columns of box X are identical to output columns of box Y, but only that the boxes are mutually subsumed in each other in terms of the rows produced.

In the preferred embodiment of the present invention, two subqueries can be merged when they are identical, as determined by the subsumption test. Merging two quantifiers involves merging two subqueries (and representative boxes X and Y) into a new subquery (SELECT box XY). During this merge, all necessary columns of both boxes will appear in box XY. By merging several subqueries into one, redundant operations can be eliminated and hence query performance is improved.

In the following example the subsumption technique is applied to the merging of two scalar quantifiers Q11 and Q12, from the subqueries of the above-defined query (Q1), where the subqueries are defined as:

Q11: SELECT C1 FROM T WHERE T.C2=X.C1

Q12: SELECT C2 FROM T WHERE T.C2=X.C1

Figure 6:
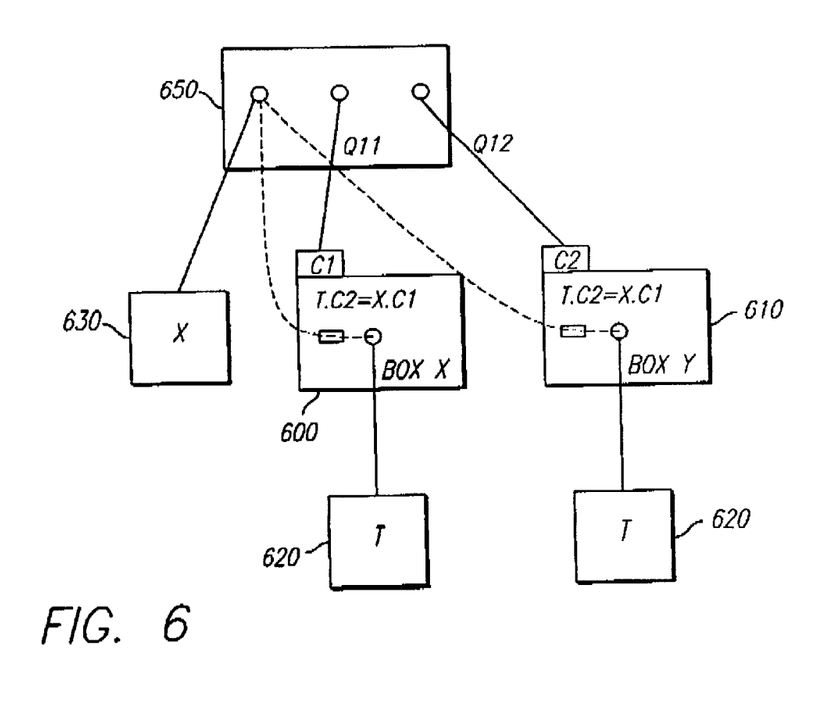
FIGS. 6-8 represent the query graph models illustrating how two scalar subqueries are merged and scalar subquery quantifiers are merged together in an example provided herein.
Figure 7:
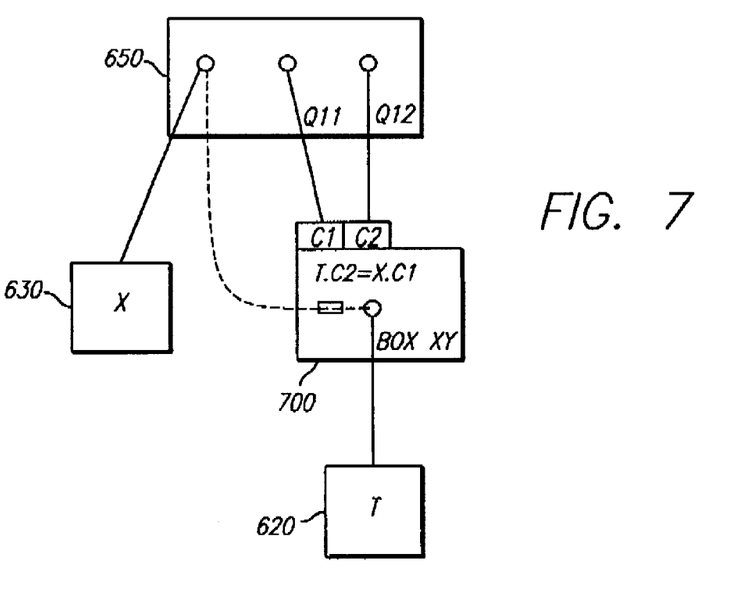

The QGM diagram of the non-optimized query Q1 is shown in FIG. 6. The quantifier Q11 ranges over the SELECT box X 600 whereas the quantifier Q12 ranges over the SELECT box Y 610. Both subqueries reference the same base table T 620. For each row of table X 630, the result set produced by the first subquery is identical to the result set produced by the second subquery Q12, except that the first subquery only selects the column C1 whereas the second subquery only selects the column C2. Both scalar subqueries will have to enforce 1) at most one row will be returned, and 2) if there is no match, a row of null will be returned via the scalar quantifier. For this reason, the result sets of these two subqueries are identical, and therefore, boxes X 600 and Y 610 can be merged into a single box XY 700, as shown in FIG. 7. In SELECT box XY 700, both columns C1 and C2 are output. Note that after the merge, the two properties of scalar subqueries are still required for enforcement.

Figure 8:
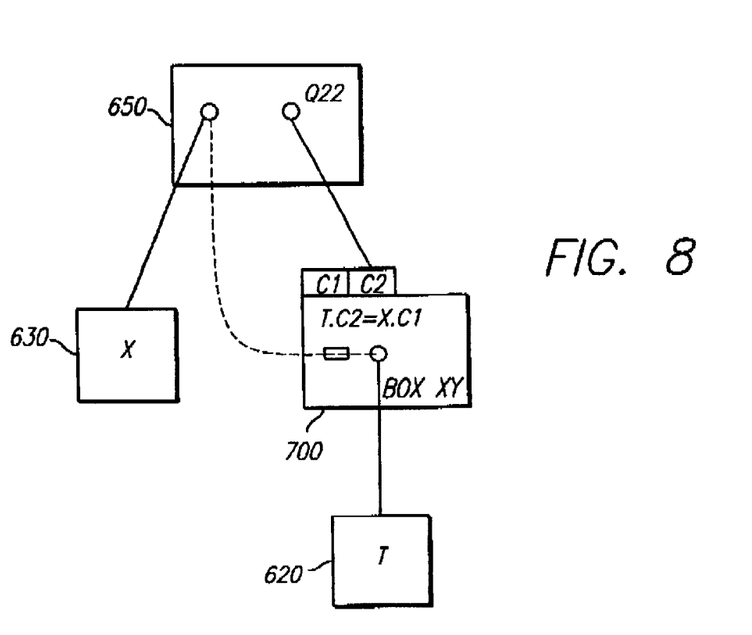

After the two subqueries are merged, the QGM contains two quantifiers Q11 and Q12, ranging over a common subexpression (SELECT box XY 700). Since exactly one row will be returned via each quantifier Q11 and Q12, Q11 and Q12 can subsequently be merged into a single scalar quantifier Q22, as shown in box 650 of FIG. 8. Note that this optimization step requires that exactly one row will be returned from each quantifier. Hence, the optimization technique applies to scalar derived tables which return exactly one row.

Using the above technique, we can optimize the following query (Q2) by merging two scalar subqueries.

---

(Q2)
SELECT (SELECT MAX(C1) FROM T WHERE T.C2=X.C1),
        (SELECT MIN(C2) FROM T WHERE T.C2=X.C1)
FROM X

---

The query can be rewritten as:

(Q2')
SELECT (SELECT MAX(C1), MIN(C2) FROM T WHERE T.C2=X.C1)
FROM X

Figure 9:
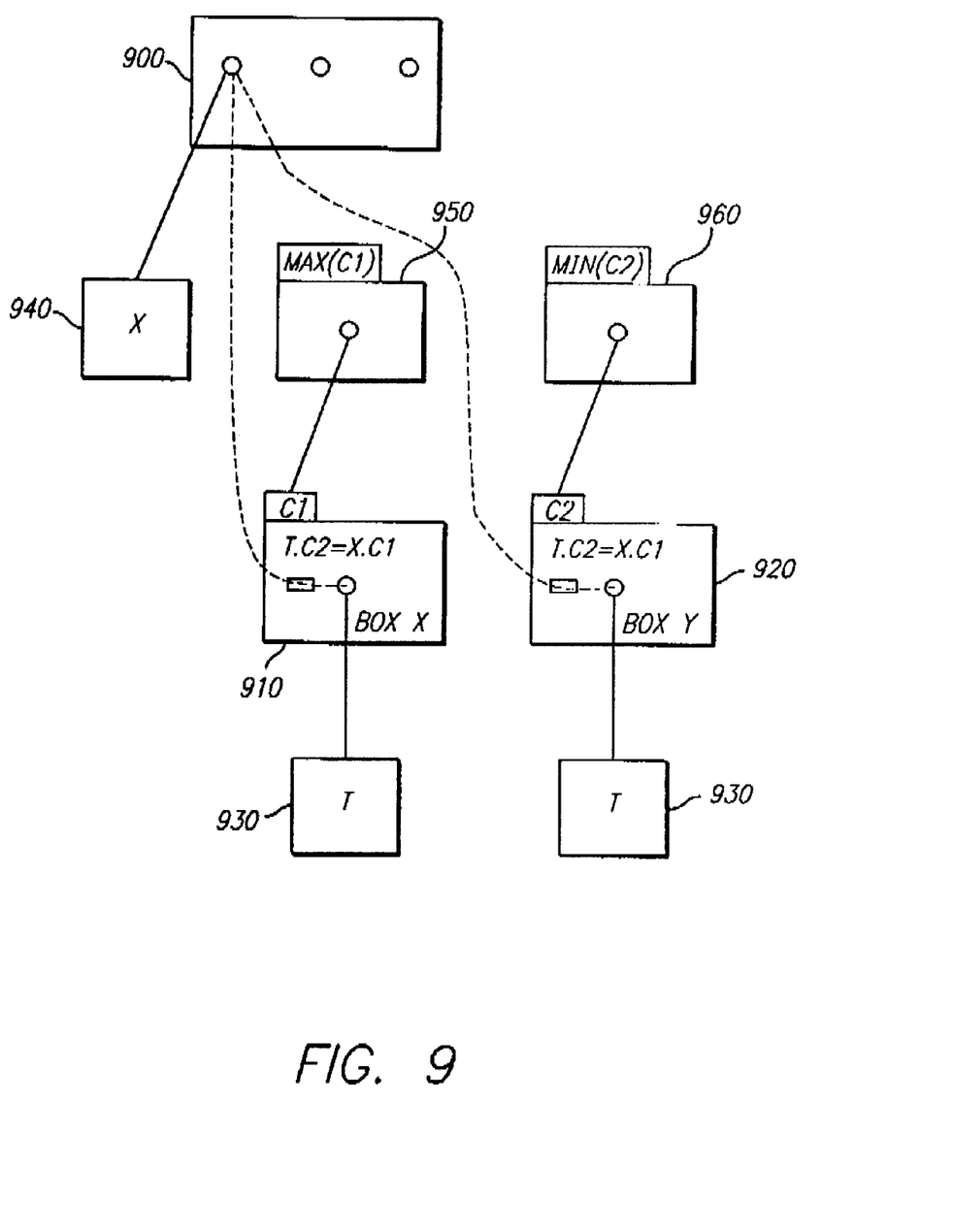
FIGS. 9-11 represent the query graph models illustrating how two scalar subqueries are merged and scalar subquery quantifiers are merged together in another example provided herein.

The QGM diagram for Q2 900 is shown in FIG. 9. There are two scalar subqueries with group by operations:

Q21: SELECT MAX(C1) FROM T WHERE T.C2=X.C1

Q22: SELECT MIN(C2) FROM T WHERE T.C2=X.C1

Figures 10, 11:
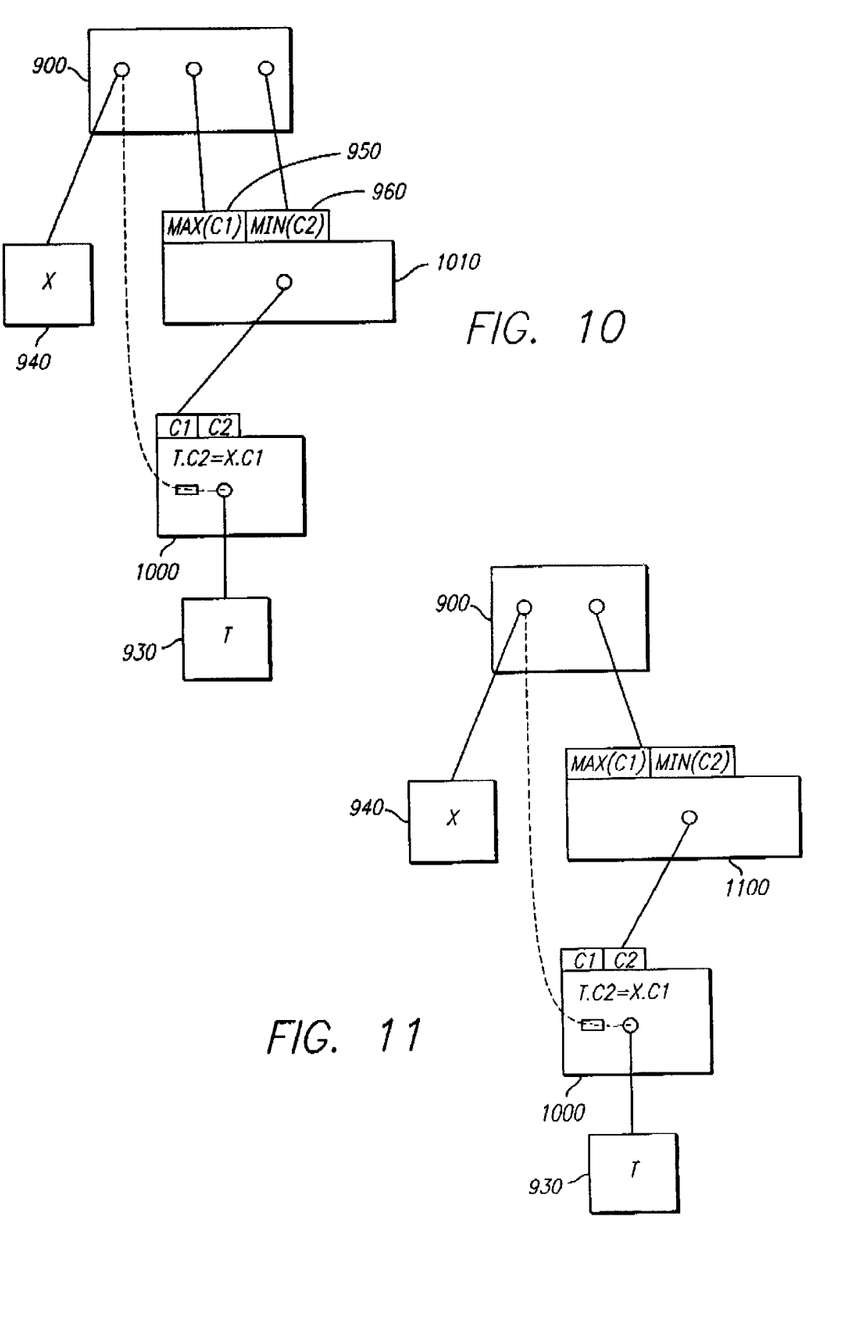

The SELECT boxes X 910 and 950 correspond to the subquery Q21 whereas the SELECT boxes Y 920 and 960 correspond to the subquery Q22. Both subqueries reference the same table T 930. For each row of table X 940, the result set of Q21 is identical to the result set of Q22, except that the output column produced by subquery Q21 is MAX(C1) 950 whereas the output column produced by subquery Q22 is MIN(C2) 960. For this reason, boxes X 910 and Y 920 can be merged into a single box XY 1000, and boxes 950 and 960 can be merged into a single box 1010, as shown in FIG. 10. After the two subqueries are merged, the QGM contains two scalar quantifiers ranging over a common SELECT box 1010 which produces at most one row. Therefore, the scalar quantifiers can be subsequently merged into a single scalar quantifier 1100, as shown in FIG. 11.

Eliminating Quantifiers

A view is a data object representing a virtual table made up of elements from one or more base tables, in accordance with the view definition. In the following example the view V is created by the following definition as:

---

CREATE VIEW V (C1, C2, C3) AS
    (SELECT (SELECT C1 FROM T WHERE T.C2=X.C1),
        (SELECT C2 FROM T WHERE T.C2=X.C2),
        C3
    FROM X)

---

The view V has two scalar subqueries.

If the following query:

(Q3)

SELECT C3 FROM V is presented, its result set includes only the third column C3 from the view V, and thus it does not need to retrieve any rows or columns from the table T by any of the two scalar subqueries of the view V.

However, a conventional query optimizer would usually generate a plan which includes the execution subplans for both scalar subqueries. Therefore, during query execution time, both scalar subqueries will be executed, even though no rows and no columns need to be retrieved from the table T by these subqueries. In this particular example,if the table T is large, a lot of system resources will be needlessly wasted.

In the preferred embodiment of the present invention, the scalar subqueries and their corresponding quantifiers are entirely eliminated from the query Q3, without affecting the correctness of the query result set, resulting in the following query:

SELECT C3 FROM X

This query simplification approach significantly improves query performance by eliminating unnecessary work. However, eliminating a quantifier can only be done under restricted conditions. For example, one cannot arbitrarily remove an 'F' type quantifier from a query only because the table that it ranges over is empty because, after the quantifier removal, the query may return some rows.

This method of quantifier and subquery elimination is applicable to scalar subqueries because a scalar subquery returns exactly one row and therefore a scalar subquery does not increase or decrease the cardinality of the result set of the query.

As a general rule followed by the method of the present invention, any quantifier can be removed from a query block when the quantifier produces exactly one row, and no columns from the subexpression that the quantifier ranges over are needed for the result set of the query. This rule applies to scalar quantifiers as well as to the regular quantifiers which produce exactly one tuple. It may also apply to a set of quantifiers.

For a scalar quantifier, a null row will always be returned when there is no match or the input tables in the scalar subquery are empty. By definition, a scalar subquery returns at most one row. Hence, a scalar quantifier produces EXACTLY one row.

In the following example of regular quantifier elimination:

SELECT X.*
FROM X, TABLE (VALUES (1, 2)) as q(C1, C2)

the derived table VALUES returns exactly one row and none of its columns needs to be returned in the answer set. For this reason, the derived table can be entirely removed, resulting in the following query:

SELECT X.*
FROM X

In the following example:

SELECT X*
FROM X, TABLE (SELECT MAX(C), MIN(C) FROM T) AS Q(MAX, MIN)

the derived table will return exactly one row. Since none of its columns are referenced in the output select list, and are not needed for the answer set, the derived table can be entirely removed, resulting in the query:

SELECT X.*
FROM X

In the following example:

SELECT X.*
FROM X
WHERE C1>C2 OR (EXISTS (SELECT MIN(C1) FROM T))

the EXISTS subquery is guaranteed to return exactly one row, because of the MIN function in the subquery without a group by column. By SQL semantics definition, a GROUP BY operation without any grouping item returns exactly one row. In the above example, a null will be returned if the input to the GROUP BY operation is empty. If table T is not empty, the output will be only one row containing a minimal value of column C1.

In this case, the EXISTS subquery is always TRUE. By removing the EXISTS subquery quantifier and replacing the EXISTS predicate with a TRUE predicate (1=1), the query becomes:

SELECT X.*
FROM X
WHERE C1=C2 OR 1=1

Therefore, in this example the existential quantifier is eliminated and EXIST predicate is replaced with a TRUE predicate.

In the following example:

SELECT X.*
FROM X
WHERE C1>C2 OR (NOT EXISTS (SELECT MIN(C1) FROM T))

the NOT EXISTS subquery is guaranteed to return EXACTLY one row, and hence the NOT EXISTS subquery is always FALSE. By removing the NOT EXISTS subquery quantifier and replacing the NOT EXISTS subquery predicate with a FALSE predicate (1=0), the query becomes:

SELECT X.*
FROM X
WHERE C1>C2 OR 1=0

Therefore, in this example the existential quantifier is eliminated and NOT EXIST predicate is replaced with a FALSE predicate.

Figure 12:
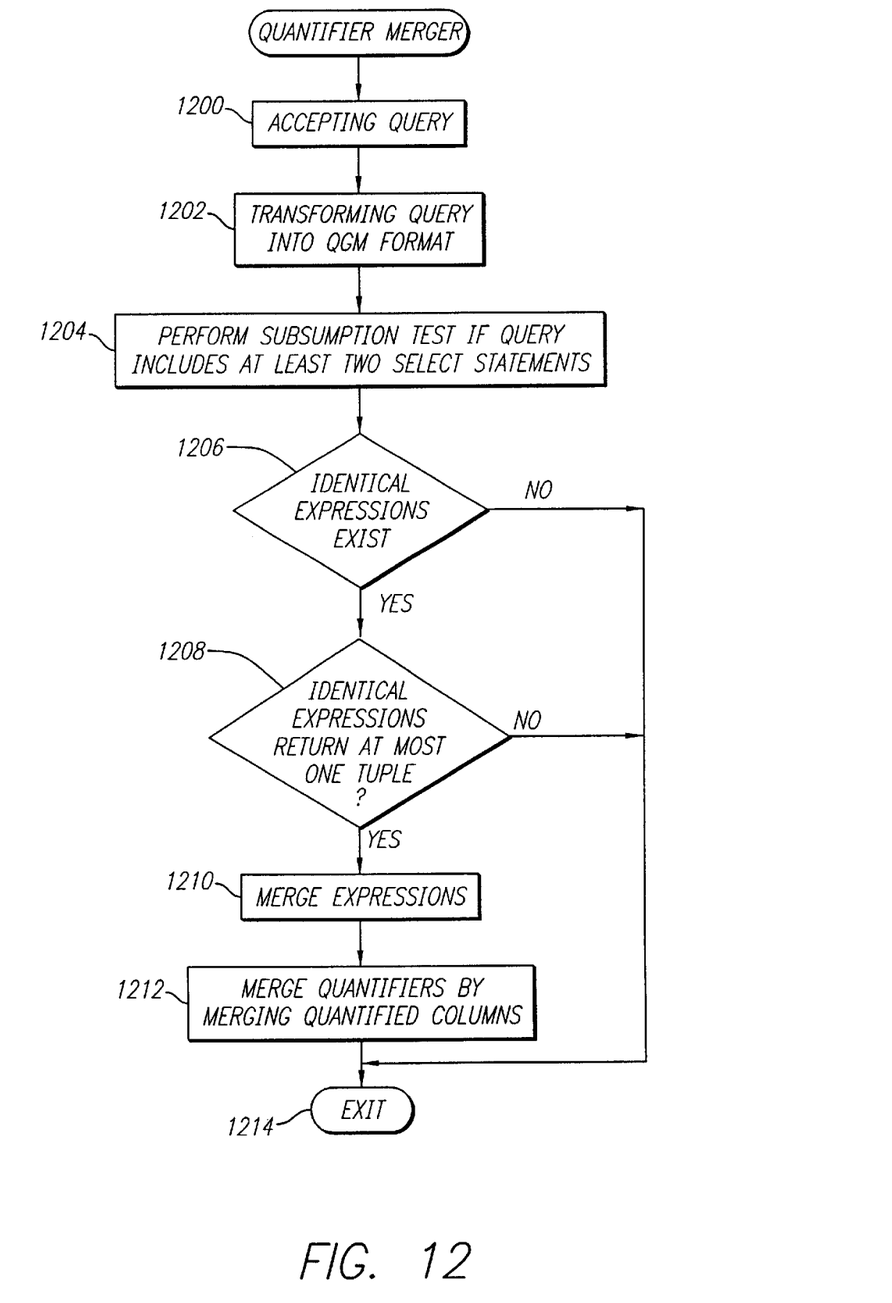
FIG. 12 is a flowchart illustrating the logic of one method of optimizing SQL series according to the present invention, used to merge quantifiers.

FIG. 12 is a flowchart illustrating the logic of optimizing SQL queries according to the present invention illustrating the quantifier merger. Block 1200 represents the RDMBS software accepting the query in the memory of the computer 102. Block 1202 represents the RDBMS software transforming a query into QGM format. Block 1204 represents the RDBMS software for performing the subsumption test, if the query includes at least two subselect expressions. Block 1206 represents the RDBMS software analyzing the query and performed subsumption test, if any. If so, block 1208 represents the RDBMS software testing whether each of the found identical subselect expressions returns at most one tuple, which may include scalar subqueries. If so, the identical subselect expressions are merged in block 1210 into a fewer number of query blocks, preferably a single query block. In block 1212 quantifiers are merged by merging quantified columns, thereby providing superior performance. This procedure may be repeated until no further quantifier merger is possible. After these steps, block 1214 returns control to block 204 in FIG. 3 or block 310 in FIG. 4 for subsequent processing steps, including the execution of the SQL query against the database and the output of the result set.

Figure 13:
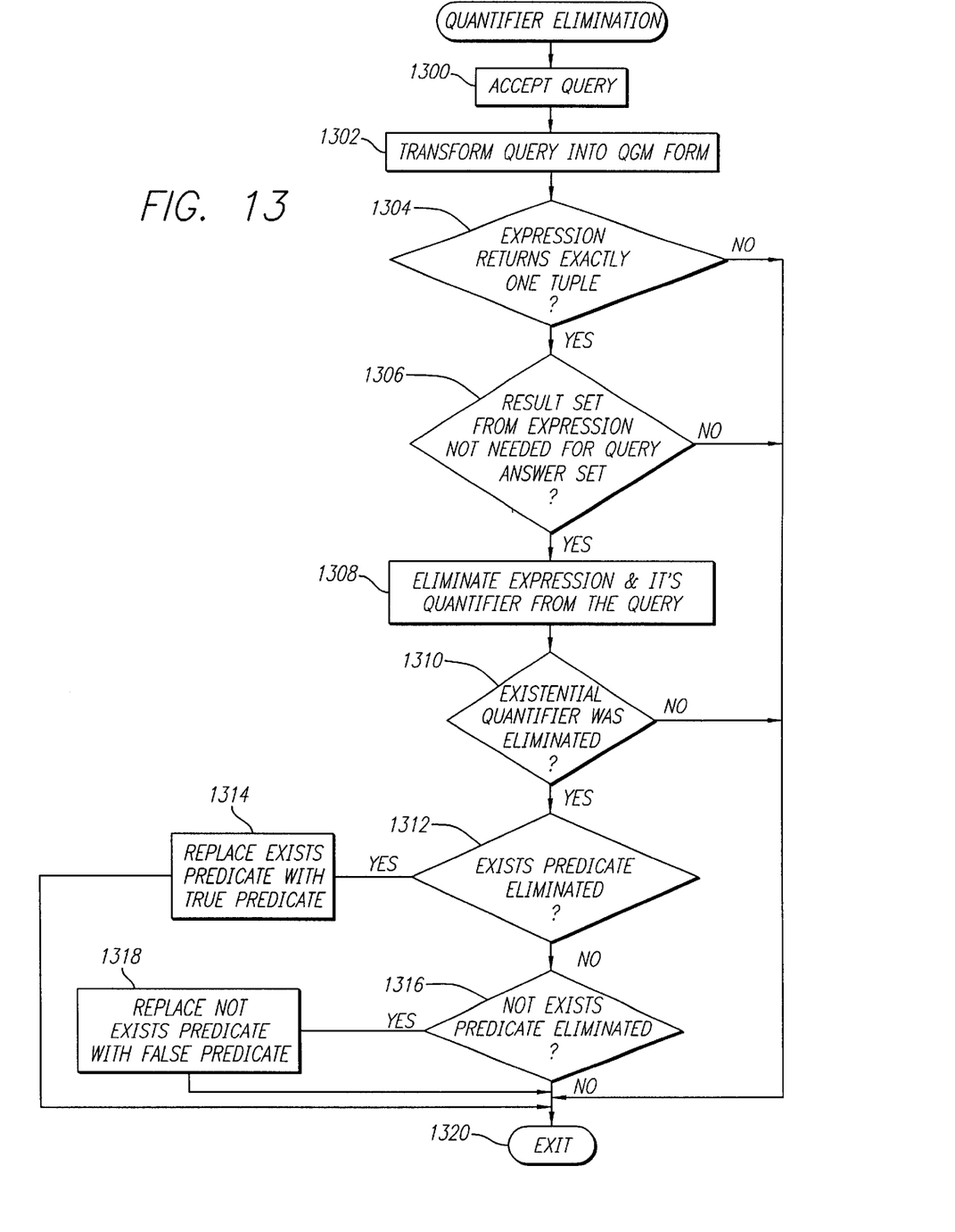
FIG. 13 is a flowchart illustrating the logic of another method of optimizing SQL series according to the present invention, used to eliminate quantifiers.

FIG. 13 is a flowchart illustrating the logic of optimizing SQL queries according to the present invention illustrating the quantifier elimination. Block 1300 represents the RDMBS software accepting the query in the memory of the computer 102. Block 1302 represents the RDBMS software transforming a query into QGM format. Block 1304 represents the RDBMS software testing whether the subselect expression returns exactly one tuple, which may include a scalar subquery. If so, block 1306 represents the RDBMS software testing whether the result set from the subselect expression is not needed for the query answer set. If so, block 1308 represents the RDBMS software that eliminates the subselect and its quantifier from the query. Block 1310 represents the RDBMS software testing whether the eliminated quantifier is an existential quantifier. If so, if in block 1312 the existential predicate is determined to be an EXIST predicate it is replaced with a TRUE predicate in block 1314. If the existential predicate is determined in block 1316 to be a NOT EXIST predicate, it is replaced in block 1318 with a FALSE predicate. This procedure may be repeated until no further quantifier elimination is possible. After these steps, block 1320 returns control to block 204 in FIG. 3 or block 310 in FIG. 4 for subsequent processing steps, including the execution of the SQL query against the database and the output of the result set.

The foregoing description of the preferred embodiments of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer, the query being performed by the computer to retrieve data from database stored in an electronic storage device coupled to the computer, the method comprising the steps of:

(a) analyzing the query to determine whether the query includes at least two subselect expressions;

(b) if so, determining whether each of the identified subselect expressions returns at most one tuple from the database;

(c) if so, performing the subsumption test to determine whether the row sets produced by the two subselect expressions are identical wherein the output columns of the row sets may be different;

(d) if so, performing the following steps:
 (d1) merging the subselect expressions into a single subselect expression, and
 (d2) merging quantifiers corresponding to said merged subselect expressions and forming a single quantifier; and (e) executing the query in the computer to retrieve data from the database.

2. The method according to claim 1, wherein the step (b) determines whether any one of the identified subselect expressions comprises a scalar subquery.

3. The method according to claim 1, wherein the step (b) determines whether any one of the identified subselect expressions comprises a scalar derived table.

4. The method according to claim 1, wherein the subsumption test of the step (c) further comprising a predicate mapping to determine whether the predicate row sets of the two identified subselect expressions are identical.

5. An apparatus for optimizing a query, comprising:
 a computer having an electronic storage device coupled thereto for storing a database, the query being performed by the computer to retrieve data from the database;
 means, performed by the computer, for analyzing the query to determine whether the query includes at least two subselect expressions;
 means, performed by the computer, for determining whether each one of the identified subselect expressions returns at most one tuple from the database;
 means, performed by the computer, for performing the subsumption test to determine whether the row sets produced by the two subselect expressions are identical wherein the output columns of the row sets may be different;
 means, performed by the computer, for merging the identical subselect expressions into a single subselect expression,
 means, performed by the computer, for merging quantifiers corresponding to said merged subselect expressions and forming a single quantifier; and
 means, performed by the computer, for executing the query in the computer to retrieve data from the database.

6. The apparatus according to claim 5, wherein any one of the identified subselect expressions comprises a scalar subquery.

7. The apparatus according to claim 5, wherein any one of the identified subselect expressions comprises a scalar derived table.

8. The apparatus according to claim 5, wherein the subsumption test means further determining whether the predicate sets of the two identified subselect expressions are identical via predicate mapping.

9. A program storage device readable by a computer tangibly embodying a program of instructions executable by the computer to perform method steps for optimizing a query, the query being performed by the computer to retrieve data from a database stored in an electronic storage device coupled to the computer, the method comprising the steps of:

(a) analyzing the query to determine whether the query includes at least two subselect expressions;

(b) if so, determining whether each of the identified subselect expressions returns at most one tuple from the database;

(c) if so, performing the subsumption test to determine whether the row sets produced by the two subselect expressions art identical wherein the output columns of the row sets may be different;

(d) if so, performing the following steps:
 (d1) merging the subselect expressions into a single subselect expression, and
 (d2) merging quantifiers corresponding to said merged subselect expressions and forming a single quantifier; and (e) executing the query in the computer to retrieve data from the database.

10. The method according to claim 9, wherein the step (b) determines whether any one of the identified subselect expressions comprises a scalar subquery.

11. The method according to claim 9, wherein the step (b) determines whether any one of the identified subselect expressions comprises a scalar derived table.

12. The method according to claim 9, wherein the subsumption test of the step (c) further comprising a predicate mapping to determine whether the predicate row sets of the two identified subselect expressions are identical.

13. A method of optimizing a query in a computer, the query being performed by the computer to retrieve data frown a database stored in an electronic storage device coupled to the computer, the method comprising the steps of:

(a) analyzing the query to determine whether the query includes at least one subselect expression;

(b) if so, determining whether the subselect expression returns exactly one row from the database;

(c) if so, determining whether the none of the columns from the returned row are required for the query answer set;

(d) if so, eliminating the subselect expression and the quantifier corresponding to said subselect expression; and (e) executing the query in the computer to retrieve data from the database.

14. The method according to claim 13, wherein the step (b) determines whether tile subselect expression comprises a scalar subquery.

15. The method according to claim 13, wherein the step (b) determines whether the subselect expression comprises a scalar derived table.

16. The method according to claim 13 further comprising the steps of:
 determining whether the eliminated subselect expression includes an EXIST predicate; and
 if so, replacing the eliminated EXIST predicate with a TRUE predicate.

17. The method according to claim 13 further comprising the steps of:
 determining whether the eliminated subselect expression includes a NOT EXIST predicate; and
 if so, replacing the eliminated NOT EXIST predicate with a FALSE predicate.

18. An apparatus for optimizing a query, comprising:

a computer having an electronic storage device coupled thereto for storing a database, the query being performed by the computer to retrieve data from the database;

means, performed by the computer, for analyzing the query to determine whether the query includes at least one subselect expression;

means, performed by the computer, for determining whether the subselect expression returns exactly one row from the database;

means, performed by the computer, for determining whether none of the columns from the returned row are required for the query answer set;

means, performed by the computer, for eliminating the subselect expression and the quantifier corresponding to said subselect expression; and means, performed by the computer, for executing the query in the computer to retrieve data from the database.

19. The apparatus according to claim 18, wherein said subselect expressions comprise a scalar subquery.

20. The apparatus according to claim 18, wherein said subselect expressions comprise a scalar derived table.

21. The apparatus according to claim 18 further comprising:

means, performed by the computer, for determining whether the eliminated subselect expression includes an EXIST predicate; and means, performed by the computer, for replacing the eliminated EXIST predicate with a TRUE predicate.

22. The apparatus according to claim 18 further comprising:

means, performed by the computer, for determining whether the eliminated subselect expression includes a NOT EXIST predicate; and means, performed by the computer, for replacing the eliminated NOT EXIST predicate with a FALSE predicate.

23. A program storage device readable by a computer tangibly embodying a program of instructions executable by the computer to perform method steps for optimizing a query, the query being performed by the computer to retrieve data from a database stored in an electronic storage device coupled to the computer, the method comprising the steps of:

(a) analyzing the query to determine whether the query includes at least one subselect expression;

(b) if so, determining whether the subselect expression returns exactly one row from the database;

(c) if so, determining whether none of the columns from the returned row are required for the query answer set;

(d) if so, eliminating the subselect expression and the quantifier corresponding to said subselect expression; and (e) executing the query in the computer to retrieve data from the database.

24. The method according to claim 23, wherein the step (b) determines whether the subselect expression comprises a scalar subquery.

25. The method according to claim 23, wherein the step (b) determines whether the subselect expression comprises a scalar derived table.

26. The method according to claim 23 further comprising the steps of:

determining whether the eliminated subselect expression includes an EXIST predicate; and if so, replacing the eliminated EXIST predicate with a TRUE predicate.

27. The method according to claim 23 further comprising the steps of:

determining whether the eliminated subselect expression includes a NOT EXIST predicate; and if so, replacing the eliminated NOT EXIST predicate with a FALSE predicate.

* * * * *